April 2, 1963 R. A. HORROCKS 3,083,947
COMPRESSOR SPACER
Filed March 3, 1960
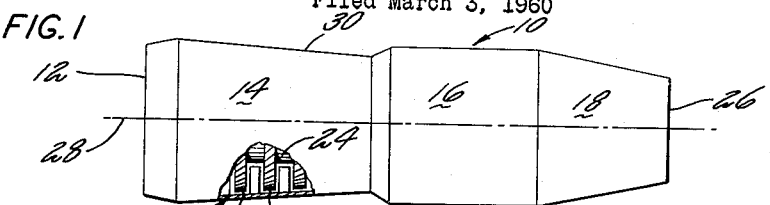
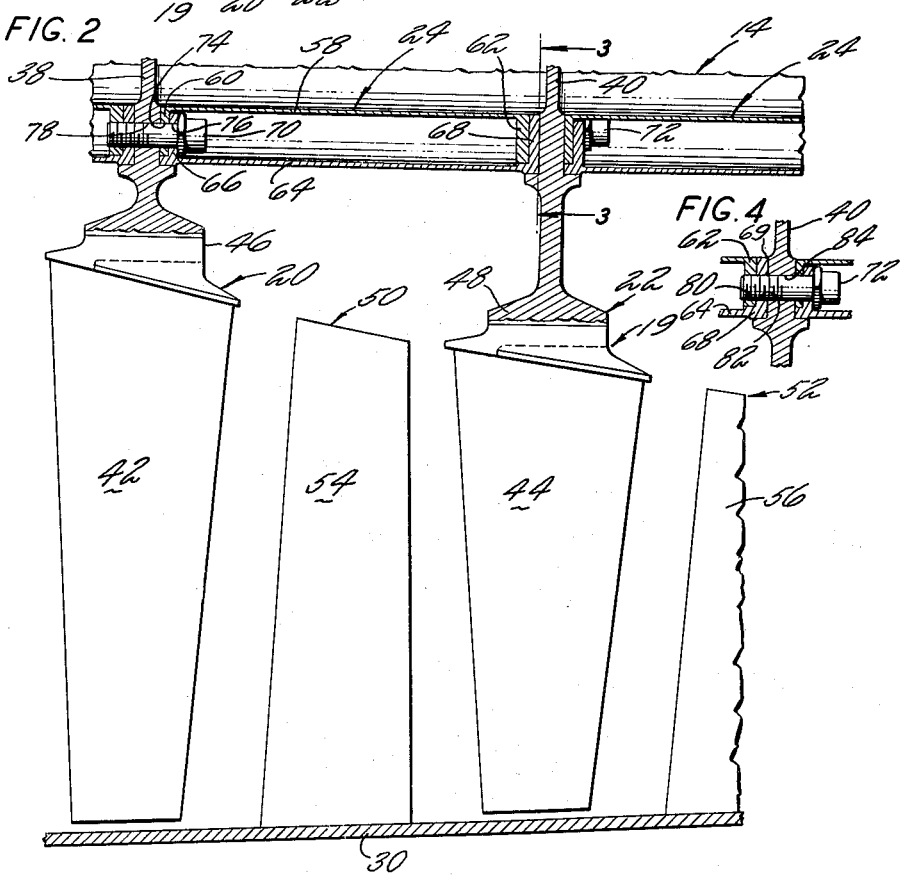
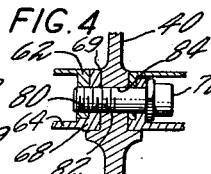
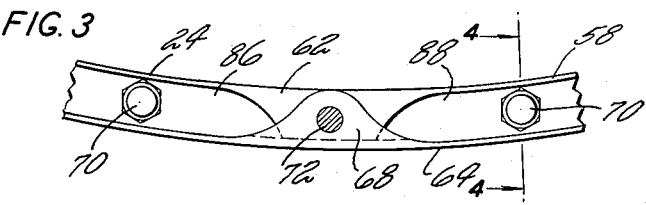
INVENTOR
REX A. HORROCKS
BY Vernon F. Hauschild
ATTORNEY 3,083,947
COMPRESSOR SPACER
Rex A. Horrocks, Marlborough, Conn., assignor to United Aircraft Corporation, East Hartford, Conn., a corporation of Delaware
Filed Mar. 3, 1960, Ser. No. 12,540
7 Claims. (Cl. 253—39)

This invention relates to flight vehicles and more particularly to the spacing and supporting of rotor discs of the compressor and turbine type used therewith.

In the past, turbines and compressors have been assembled by having a large central shaft or a series of circumferentially positioned thru-bolts passing through all rotor discs thereof but such arrangements have proved to be heavy in weight and are inefficient for adequate rotor support.

It is an object of this invention to teach rotor spacing and connecting means which are light in weight yet of sturdy construction.

It is an object of this invention to provide two cylindrical or conical walls which would share the axial and transverse bending moments tending to pull the rotor apart. Since these loads would split approximately equally between the two spacer sleeves, they would need only be half as thick as a single wall spacer. With half the load on a sleeve the number of bolts could be reduced to approximately half that required to hold down a single wall spacer due to a sleeve torque cancelling action. With the double wall construction, one circumferential set of bolts which is adequate to hold down one sleeve under half load serves two sleeves simultaneously. To maintain rotor dimensional integrity it is required that the spacer flange be held flush against the disc at both outer and inner edges of the flange under maximum loads. With the construction taught herein, it takes no more bolts to resist prying up of one flange edge than to resist lifting up of the complete flange, both inner and outer edges together, with twice the load.

It is a further object of this invention to teach rotor spacing and supporting means comprising a double walled spacer unit extending between adjacent rotor discs and comprising radially spaced cylindrical sleeves adjoined by radially projecting circumferential flanges at their forward and after ends, which flanges are joined together and to the rotor discs by a series of circumferentially positioned small bolts.

It is a further object of this invention to teach a rotor spacing and connection apparatus in which the connecting bolts for adjacent rotors are in axial alignment to eliminate bolt head severing torque therefrom which would otherwise be caused by passing thrust loads therethrough if the connecting bolts were radially displaced.

It is a further object of this invention to teach a disc spacing and connecting apparatus which permits complete disassembling of the compressor or turbine when access is available from one side thereof only and in which the aforementioned end flanges are scalloped to permit access therethrough.

It is a further object of this invention to teach disc spacing and support means which may be used at any radial position between adjacent discs to afford maximum bolt diameter positioning and connecting the discs so that the spacer means between each set of adjacent discs need not be of common diameter.

Other objects and advantages will be apparent from the specification and claims, and from the accompanying drawings which illustrate an embodiment of the invention.

FIG. 1 is an external showing of a modern aircraft jet engine partially broken away to illustrate my invention in its environment.

FIG. 2 is an enlarged showing of my invention as illustrated in the broken away portion of FIG. 1.

FIG. 3 is a partial showing taken along line 3—3 of FIG. 2.

FIG. 4 is a view taken along FIG. 4 of FIG. 3.

Referring to FIG. 1 we see modern aircraft flight vehicle or thrust generating engine 10 which may be of the type taught in United States Patents Nos. 2,711,631 or 2,747,367 and which comprises air inlet section 12, compressor section 14, burner section 16 and turbine section 18. While an afterburner unit is not shown downstream of turbine section 18, such could obviously be used without departing from the spirit or scope of my invention. In engine 10, atmospheric air enters through inlet 12, is compressed in passing through the rotor assembly 19 of compressor section 14 which comprises a plurality of axially spaced rotors 20 and 22 which are supported in spaced relation by my spacer unit 24. The compressed air from compressor 14 is heated and thereby has energy imparted thereto in passing through burner section 16, then has sufficient energy extracted therefrom to drive compressor 14 while passing through turbine 18 and is then discharged to atmosphere through exhaust outlet 26 to generate thrust. The compressor 14, burner 16 and turbine 18 of engine 10 are aligned along axis 28 and enveloped within engine case 30, which is preferably of circular cross section.

My invention is shown in greater particularity in FIG. 2 wherein axially aligned and spaced rotor discs 20 and 22 are shown to comprise discs 38 and 40 and a plurality of radially extending and circumferentially positioned blades 42 and 44 projecting therefrom and connected thereto by blade connecting means 46 and 48, which may be of the well-known fir-tree variety. Stator units 50 and 52 are positioned between adjacent rotors such as 20 and 22 and comprise a plurality of radially extending and circumferentially positioned stationary vanes 54 and 56.

Double walled spacer unit 24 performs the function of connecting adjacent rotor discs 20 and 22 and supporting them in axially spaced relation so as to permit the positioning of stator units such as 50 therebetween. Spacer unit 24, together with rotors 20 and 22, are of circular shape and concentric about axis 28, and comprises inner cylindrical sleeve 58 which has forward radially outward projecting circumferential end flange 60 and after radially outward projecting circumferentially extending end flange 62 at the opposite ends thereof. Outer cylindrical sleeve 64 is spaced a slight distance radially outward of sleeve 58 and is concentric therewith and comprises forward radially inward directed and circumferentially extending end flange 66 and after radially inward projecting circumferentially extending end flange 68. With this construction it will be obvious that double wall spacer unit 24 comprises an annular hoop of box-shaped cross section and with its forward end flanges 60 and 66 abutting and its after end flanges 62 and 68 abutting in juxtaposition and connected to adjacent rotor discs 20 and 22 by connecting means 70 and 72, respectively. Forward end flanges 60 and 66 include bolt holes 74 and 76, respectively, which are in axial alignment with and of common radial displacement from axis 28 with bolt holes 78 of rotor disc 20. After end flanges 62 and 68 have bolt holes 80 and 82, respectively, which are in axial alignment with and of common radial displacement from axis 28 as bolt holes 84 in rotor disc 22.

Since the bolt circles of bolts 70 and 72 are of common diameter and concentric about axis 28, there is no torque imparted to end flanges such as 60 and 66 of a nature which will attempt to shear off the head of bolt 70 so that fewer bolts 70 and 72 need be used and, due to the aforementioned torque elimination, and the thickness of sleeves 58 and 64 and end flanges 60, 62, 66 and 68 may be reduced to a minimum dimension for weight-saving purposes. Further, because bolts such as 70 and 72 are used as opposed to the forerunner thru-bolts which extend as a single unit through all rotors, a further weight-saving is effected.

Referring to FIG. 4, it may be seen that the double wall spacers saves engine weight by reducing the load on the parts involved. Since air compression occurs and hence air pressure builds up progressively with each succeeding compressor stage, a greater air load is imparted to each successive compressor rotor disc such as 38 and 40 and the discs therefor tend to separate and place spacer units 24 and bolts 70 and 72 in tension. If we were using a single spacer 64 alone and an axial (tension) and transverse bending moment load of 10,000 lbs. were carried therethru, the load action would be to cause flange 68 to rotate clockwise about point 69. Since sleeve 64 is twice the distance from pivot point 69 than is bolt 72, the bolt load would be 20,000 lbs. and the pivot action of flange 68 places a prying load on the head of bolt 72. With a double wall spacer, the load per sleeve would be 5,000 lbs. and, since the pivot action on flanges 62 and 68 would be canceling, the bolt load would be 10,000 lbs. in pure tension because of the cancellation of the flange prying actions. Accordingly, the spacer wall thickness and bolt number and size can be reduced appreciably.

As best shown in FIG. 3 after end flanges 62 and 68 are scalloped to define access holes such as 86 and 88 therebetween to permit access to bolts 70, which are circumferentially offset from bolts 72. Accordingly, it will be noted that it is possible to disassemble the various discs 20 and 22 of compressor unit 14 when access thereto is available from one side of the compressor only.

It is to be understood that the invention is not limited to the specific embodiment herein illustrated and described but may be used in other ways without departure from its spirit as defined by the following claims.

I claim:

1. In a rotor assembly of the compressor-turbine type mounted for rotation about an axis and generating unidirectional gas pressure change throughout its length axially spaced rotor discs positioned along said axis to be subjected to separating forces due to dissimilar gas pressure caused by the unidirectional gas pressure change, a spacer unit extending therebetween and including a first sleeve of circular cross-section and a second sleeve of circular cross-section positioned radially from said first sleeve, said sleeves being concentric about said axis and each having radial end flanges with the respective end flanges of each sleeve extending in opposite radial directions and overlapping radially and abutting each other and said rotor discs axially so that said spacer unit is of box-shaped cross section, and means joining said rotor discs to said spacer unit to prevent separation of said discs.

2. In a rotor assembly of the compressor-turbine type mounted for rotation about an axis and generating unidirectional gas pressure change throughout its length axially spaced rotor discs positioned along said axis to be subjected to separating forces due to dissimilar gas pressure caused by the unidirectional gas pressure change, a double-walled spacer unit extending therebetween and including a first sleeve of circular cross-section and a second sleeve of circular cross-section concentric with and positioned radially outward from said first sleeve, said first sleeve having circumferentially extending and radially outwardly projecting end flanges, said second sleeve having circumferentially extending and radially inwardly projecting end flanges with the respective end flanges of each sleeve overlapping radially and abutting each other and said rotor discs axially so that said spacer unit is of box-shaped cross section, and means joining said rotor discs to said spacer unit to prevent relative axial motion between said discs.

3. In a rotor assembly of the compressor-turbine type mounted for rotation about an axis and generating unidirectional gas pressure change throughout its length axially spaced rotor discs positioned along said axis to be subjected to separating forces due to dissimilar gas pressure caused by the unidirectional gas pressure change, a double-walled spacer unit extending therebetween and including a first sleeve of circular cross-section and a second sleeve of circular cross-section concentric with and positioned radially outward from said first sleeve, said first sleeve having circumferentially extending and radially outwardly projecting end flanges, said second sleeve having circumferentially extending and radially inwardly projecting end flanges with the respective end flanges of each sleeve overlapping radially and abutting each other and said rotor discs axially so that said spacer unit is of box-shaped cross section, bolt holes of a common radius from said axis in said discs and said end flanges, and bolt means passing thru said bolt holes to join said discs thru said spacer unit to prevent relative axial motion between said discs.

4. In a rotor assembly of the compressor-turbine type mounted for rotation about an axis, axially spaced forward and after rotor discs, a double-walled spacer unit extending therebetween and including a first cylindrical sleeve and a second cylindrical sleeve concentric with and positioned radially outward from said first sleeve, said first sleeve having a circumferentially extending and radially outwardly projecting end flange at its forward and after ends, said second sleeve having a circumferentially extending and radially inwardly projecting end flanges at its forward and after ends with the respective end flanges of each sleeve overlapping radially and abutting each other axially and said rotor discs so that said spacer unit is of box-shaped cross section, bolt holes of a common radius from said axis in said discs and said end flanges, said bolt holes in said forward disc and flanges being axially aligned and circumferentially off-set from the axially aligned bolt holes in said after disc and flanges and bolt means joining said rotor discs to said spacer unit.

5. In a rotor assembly of the compressor-turbine type mounted for rotation about an axis, axially spaced forward and after rotor discs, a double-walled spacer unit extending therebetween and including a first cylindrical sleeve and a second cylindrical sleeve concentric with and positioned slightly radially outward from said first sleeve, said first sleeve having a circumferentially extending and radially outwardly projecting end flange at its forward and after ends, said second sleeve having a circumferentially extending and radially inwardly projecting end flanges at its forward and after ends with the respective end flanges of each sleeve overlapping radially and abutting each other axially and said rotor discs so that said spacer unit is of box-shaped cross section, bolt holes of a common radius from said axis in said discs and said end flanges, said bolt holes in said forward disc and flanges being axially aligned and circumferentially off-set from the axially aligned bolt holes in said after disc and flanges, said after end flanges being scalloped to permit access to said forward end flanges therethru, and bolts passing thru said forward aligned bolt holes and said after aligned bolt holes to join said discs thru said spacer unit.

6. In a rotor assembly of the compressor-turbine type mounted for rotation about an axis, axially spaced forward and after rotor discs, a double-walled spacer unit extending therebetween and including a first cylindrical sleeve and a second cylindrical sleeve concentric with and positioned slightly radially outward from said first sleeve, said first sleeve having a circumferentially extending and radially outwardly projecting end flange at its forward and after ends, said second sleeve having a circumferentially extending and radially inwardly projecting end flanges at its forward and after ends with the respective end flanges of each sleeve overlapping radially and abutting each other axially and said rotor discs so that said spacer unit is of box-shaped cross section, bolt holes of a common radius from said axis in said discs and said end flanges, said bolt holes in said forward disc and flanges being axially aligned and circumferentially off-set from the axially aligned bolt holes in said after disc and flanges, said after end flanges being scalloped to permit access to said forward end flanges therethru, and short bolts passing thru said forward aligned bolt holes and said after aligned bolt holes to join said discs thru said spacer unit.

7. Disc spacer and connecting means for use between rotor discs comprising an annular hoop of box-shaped cross section concentric about an axis including an inner cylindrical sleeve having forward and after radially outwardly projecting circumferential end flanges, an outer cylindrical sleeve spaced slightly radially from and concentrically enveloping said inner sleeve and having forward and after radially inwardly projecting circumferential end flanges, said sleeves and flanges dimensioned so that said forward flanges overlap radially and abut axially and said after flanges overlap radially and abut axially, axially aligned bolt holes in said forward flanges, axially aligned bolt holes in said after flanges circumferentially spaced from said forward flange bolt holes, all of said bolt holes being of a common bolt circle, and said after flanges being scalloped to define access holes to said forward flange bolt holes therebetween.

References Cited in the file of this patent

UNITED STATES PATENTS

| | | |
|---|---|---|
| 2,618,463 | Lombard et al. | Nov. 18, 1952 |
| 2,662,685 | Blanc | Dec. 15, 1953 |
| 2,847,184 | Islip | Aug. 12, 1958 |
| 2,868,439 | Hampshire et al. | Jan. 13, 1959 |
| 2,869,820 | Marchant et al. | Jan. 20, 1959 |
| 2,973,938 | Alford | Mar. 7, 1961 |

FOREIGN PATENTS

| | | |
|---|---|---|
| 1,077,667 | France | May 5, 1954 |